United States Patent [19]
Coughlin

[11] 3,779,388
[45] Dec. 18, 1973

[54] STRAINER SHUT-OFF VALVE WITH MANUAL BACK-FLUSH

[76] Inventor: Donald W. Coughlin, P. O. Box 2025, 3170 State St., San Bernardino, Calif. 92405

[22] Filed: Dec. 30, 1971

[21] Appl. No.: 214,157

[52] U.S. Cl.............................. 210/390, 210/392
[51] Int. Cl............................................ B01d 35/02
[58] Field of Search............................ 55/302, 303; 210/390–393, 411, 412, 422, 423, 425, 426, 427, 440

[56] References Cited
UNITED STATES PATENTS
1,671,487  5/1928  Quiroz et al..................... 210/392
3,348,694  10/1967  Smith.............................. 210/390

*Primary Examiner*—Samih N. Zaharna
*Assistant Examiner*—Robert H. Spitzer
*Attorney*—Dana E. Keech

[57] ABSTRACT

The valve body provides a cylindrical bore rotatably confining a cylindrical rotor, the body having fluid inlet and outlet connections for interposing the valve in a domestic water service line just outside the water meter, and a drain connection leading to the waste system. Concentrically embodied in the rotor is a strainer chamber enclosing a cylindrical screen. Valve passages are provided in said rotor whereby: one setting of this rotor closes the drain connection and causes water to flow from the inlet connection to the strainer chamber and from the interior of the screen to said outlet connection thereby retaining solids in the strainer chamber; a second rotor setting shuts the outlet connection, leaves the inlet connection connected to the strainer chamber and connects the latter with the drain connection thereby flushing accumulated solids from the strainer chamber under service line pressure; a third rotor setting shuts the inlet connection, connects the outlet connection with the strainer chamber and leaves the latter connected with the drain connection thereby draining to waste the water in the premises, including the meter, and preventing ice damage from freezing; and a fourth rotor setting reverses the direction water entering from the inlet connection takes in its flowing through the screen, thereby cleaning fibrous matter from the exterior of the screen and flushing this to waste.

8 Claims, 3 Drawing Figures

PATENTED DEC 18 1973

3,779,388

STRAINER SHUT-OFF VALVE WITH MANUAL BACK-FLUSH

SUMMARY OF INVENTION

The code calls for a shut-off valve just outside the meter in any domestic water service connection. Where excessive amounts of sand are entrained in the water, the installation of a strainer is required. Separate fixtures are commonly employed to perform these two functions and disassembly of the strainer is generally necessary while the shut-off valve is closed to clean solids from the strainer.

It is an object of the present invention to provide, within a single fixture, a shut-off valve and a self-contained strainer, with additional means for cleaning the solids therefrom by a mere backflow of water under service line pressure through the fixture, thus rendering disassembly of the latter unnecessary in cleaning the strainer.

In subfreezing climates provision is required for draining the meters and water piping in the premises serviced, when the heating system is shut off.

It is another object of the present invention to incorporate therein, in addition to the features aforesaid, a means for accomplishing said draining function.

DETAILED DESCRIPTION OF THE PREFERRED EMBODIMENT

Figure 1:
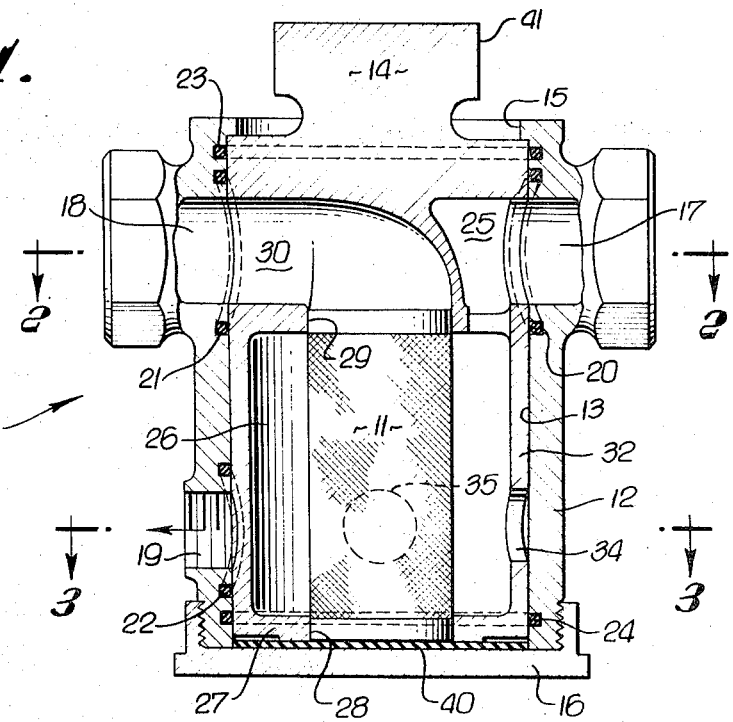
FIG. 1 is a vertical sectional view of a preferred embodiment of the invention.
Figure 2:
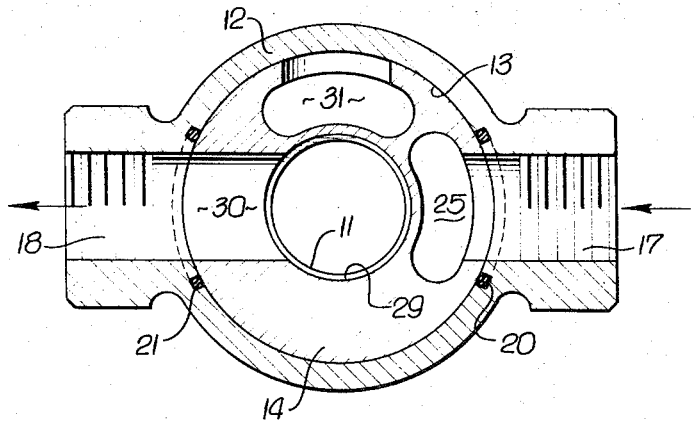
FIG. 2 is a horizontal sectional view taken on the line 2—2 of FIG. 1 and illustrating the inlet and outlet connections of the body of the invention and the cored passage ways provided in the upper end of the rotor of said valve which connect with said water inlet and water outlet connections.
Figure 3:
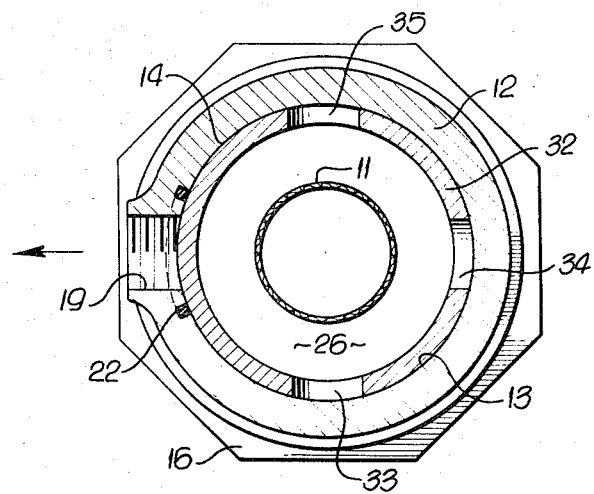
FIG. 3 is a horizontal sectional view taken on the line 3—3 of FIG. 1 and illustrates the drain connection of the body of the invention and the ports connecting the strainer chamber of the valve rotor with said drain connection for draining the strainer chamber during each of the several operative positions of said valve rotor.

The valve 10 of the invention is designed for use as a meter shut-off valve and embodies a strainer 11 which may be manually back-flushed at convenient intervals by a slight manipulation of the rotor of the valve and without the necessity of disassembling the latter. The valve is also adapted to be used as a shut-off valve and, when so used, automatically drains the domestic water system and meter of the premises to which the valve is connected, and thus removes the hazard of damage being done to the system and meter so drained by freezing while the premises are unoccupied and the heating system thereof is turned off.

The valve 10 has a cylindrical body 12 having a bore 13 in which a cylindrical rotor 14 is rotatably confined between an inturned annular flange 15 at the upper end of the body and a cap 16 screwed onto the lower end of the body. Transversely aligned inlet and outlet connections 17 and 18 are provided on the body near its upper end and which communicate at diametrically opposite points with the bore 13. The connections 17 and 18 are for use in interposing the valve 10 in a domestic water service line just outside the water meter. A drain outlet connection 19 is also formed in body 12, this drain connection being parallel with outlet connection 18 and directly therebelow and close to the lower end of the body 12.

O-rings 20, 21 and 22 are confined in suitable grooves in the bore 13 encircling connections 17, 18 and 19. O-rings 23 and 24 occupy annular grooves in bore 13 near its upper and lower ends in horizontal planes to prevent leakage upwardly or downwardly from the valve. In its normal open position, the rotor 14 presents a cored water receiving passage 25 to inlet connection 17 which directs water downward into a large cylindrical strainer chamber 26 having a floor 27 with a bore 28 in which the lower end of the strainer 11 is mounted, the upper end of the strainer fitting in a hole 29 at the lower end of a cored strained water outlet passage 30 formed in the upper portion of the rotor 14 and which, with the rotor so positioned, connects with outlet valve connection 18.

With the valve parts so positioned, and which is the normal operating condition of the valve, water enters the valve 10 through the inlet connection 17, is received by passage 25 from which it flows downwardly into the annular empty space provided in the strainer chamber 26 surrounding the screen 11, the water passing through this screen and upwardly from its open upper end the water being thence directed by the strained water outlet passage 30 to the outlet connection 18 of the valve. The solids in the water (for the most part, sand) which are unable to pass through the fine mesh of the screen 11 are separated out and deposited in the lower end of the strainer chamber 26.

Rotor 14 also has a strainer flushing passage 31 located on the same level as and disposed 90° counterclockwise from passage 25. On the same level with drain connection 19, the cylindrical wall 32 of strainer chamber 26 has three drain passages 33, 34 and 35, separated by 90° intervals and any of which may be brought into alignment with the drain connection 19 by rotating the rotor 14. To facilitate the rotation of rotor 14 in the bore 13 of the valve 10, and to hold screen 11 in place, an antifriction gasket 40 which preferably comprises a thin sheet of nylon is interposed between the lower end of the rotor 14 and the screw cap 16 of the valve 10.

Extending centrally upwardly from the rotor 14 is a wrench lug 41 for use in operating the valve.

OPERATION

The screen 11 is seen to divide the space within the strainer chamber 26 into an exterior area which surrounds the screen and an interior area which is located inside the screen. The exterior area in the screen chamber 26 is always in communication with the passageways 25 and 31 and the interior area of the strainer chamber is always in communication with the passageway 30.

The rotor 14 of the valve 10 has four operating positions. With the valve interposed in a domestic water service line just outside the water meter, and with the drain connection 19 leading to the waste system, the first operating position of the valve rotor 14 is that in which it is normally placed and is shown in all three views of the drawings. With the rotor so positioned, the drain connection 19 is shut off and water flows from the inlet connection 17 through the passage 25 into the exterior area of the strainer chamber 26 surrounding the screen 11, the water passing through the screen and upwardly from the upper end of the screen through the passage 30 and out at the outlet connection 18. Any sand or other solid material entrained in the water passing through the valve 10 is separated therefrom by the screen 11 and accumulates in the bottom of the exterior area of the strainer chamber 26. From time to time, and as often as necessary, the rotor 14 is turned a quarter turn clockwise to its second operative position in which the passage 31 places the inlet connection 17 in communication with the exterior area of the strainer chamber 26, the rotor 14 in this position shutting off the outlet connection 18 and placing the passage 33 in communication with the drain connection 19 so that water entering the strainer chamber 26 through the passage 31 under service line pressure flushes solid matter accumulated in the exterior area of the strainer chamber 26 out through the drain connection 19. The rotor 14 will be left in its second position only long enough to back-flush all the solid material from the exterior area of the strainer chamber 26 to waste through the drain connection 19 which normally takes but a few seconds. When this function has been performed, the rotor 14 is returned to its first operative position and no further attention need be paid to valve 10 until the time comes for again back-flushing accumulated solids therefrom in the manner above described.

The valve 10 performs another function by providing a means therein for draining all water from the meter and the premises served with water through said meter thereby preventing ice damage from freezing during the winter when the heating system of said premises is not in operation. To cause the valve 10 to perform this function the rotor 14 is turned to its third position which is 90° in a counterclockwise direction from its first position which causes the rotor to shut off the inlet connection 17 which shuts off the supply of water from the main line to said premises and causes the outlet connection 18 to communicate through the passage 31 with the exterior area of the strainer chamber 26 and also causes said strainer chamber to communicate through passage 35 with the drain connection 19 so as to drain to the waste system all the water from the meter and from the premises served with water through said meter. The rotor 14 is left in its third operative position just above described throughout the winter period that the heating system of said premises is turned off. When the heating of said premises is restored, the valve rotor 14 is then returned to its first operating position as shown in the drawings and the service of water to said premises is resumed.

The fourth operating position of the rotor 14 of valve 10 is accomplished by turning this 180° in either direction from its first position shown in the drawings. In its fourth operative position, the rotor 14 presents passage 25 to the outlet connection 18 and passage 30 to the inlet connection 17 so that water entering the valve 10 from the latter connection flows downwardly into the upper end of the screen 11 and outwardly therethrough into the exterior area of the strainer chamber 26 from which it flows upwardly through the passage 25 into the outlet connection 18. With the valve in its fourth operative position, the passage 34 places the exterior area of the strainer chamber 26 in communication with the drain connection 19 so that water discharged outwardly through the screen 11 into the exterior area of the strainer chamber 26 acts to back-flush solids in said exterior area outwardly through the drain connection 19. In back-flush practice the rotor 14 is only allowed to remain in its fourth operative position for a short time so as to clean the outer surface of the screen 11 by a flow of water under pressure outwardly through the pores of the screen.

Passages 25 and 31 may be properly referred to as "primary passage means;" passage 30 as a "secondary passage means;" and passages 33, 34 and 35 as "tertiary passage means."

I claim:

1. In a strainer valve with manual back-flush, the combination of:

a valve body having a cylindrical bore;

water inlet and outlet connections provided by said body and opening into said bore in transversely aligned relation near the upper end of said body;

a drain connection provided in a lower portion of said body and opening radially into said bore;

a cylindrical rotor rotatably confined in and occupying said bore, said rotor optionally having a first open position and a second back-flushing position in said bore, the major lower portion of said rotor being hollowed out to provide within said rotor a closed strainer chamber having upper and lower walls and a cylindrical outer wall;

a cylindrical strainer enclosed in said strainer chamber to allow an ample peripheral space therein exterior of said strainer, said strainer being closed at its upper end by said upper wall;

primary cored passage means in the upper portion of said rotor communicating when said rotor is in either of said positions between said inlet connection and said peripheral space in said strainer chamber;

secondary cored passage means in the upper portion of said rotor communicating, when said rotor is in said first position, between the interior of said screen and said outlet connection, said rotor having an imperforate portion shutting said drain connection when said valve is in its first operating position, whereby water flows from said inlet connection to the peripheral space in said strainer chamber, then passes through said screen and from the interior thereof flows to said outlet connection whereby the water is strained in passing through said screen and deposits solids in the peripheral space of said strainer chamber; and a drain passage in said cylindrical strainer chamber wall communicating with said body drain connection when said rotor is rotated from said open position to back-flushing position, wherein said upper portion of said rotor presents an imperforate area thereof to and closes said outlet connection while commuication is maintained through said primary cored passage means between said inlet connection and said peripheral space in said strainer chamber whereby water entering at main line pressure from said inlet connection back-flushes solids collected in said peripheral space in said strainer chamber out through said drain connection.

2. A valve as recited in claim 1 wherein:

the turning of said rotor to a third position presents an imperforate area on said rotor to said inlet connection, thereby shutting off the supply of water to the premises served by said valve, and connects said primary passage means both with said outlet connection and with the peripheral space in said strainer chamber;

the cylindrical wall of said strainer chamber having a second drain passage which, in said third position of said rotor, is brought into communication with said valve body drain connection whereby water is drained to waste from the entire domestic water system with which said outlet connection is connected.

3. A valve as recited in claim 1 wherein
said strainer is replaceably mounted in said strainer chamber co-axially with said rotor in aligned holes provided in said upper and lower walls of said chamber;
cap means applied to the lower end of said valve body for closing said bore and retaining said rotor therein and for closing the strainer receiving hole in said lower strainer chamber wall;
an internal annular lip on said body at the upper end of said bore said lip cooperating with said cap means to retain said rotor in said bore; and
a sealing dry-lubricant gasket between said cap means and said rotor.

4. A value as recited in claim 1 wherein
annular grooves occupied by O-rings are provided in said bore encircling upper and lower end portions of the entire rotor and with similar annular grooves occupied by O-rings encircling respectively said inlet, outlet and drain connections.

5. In a strainer valve with manual back-flush, the combination of:
a valve body having a substantially cylindrical bore;
water inlet, outlet and drain connections provided on said body and opening radially into said bore;
a rotor rotatably fitting and occupying said bore and having a portion thereof hollowed out to provide wholly within said rotor a strainer chamber;
a screen mounted in said chamber to divide said chamber into two spaces, one external with respect to said screen and the other internal with respect to said screen;
said rotor having primary, secondary and tertiary passage means and first and second rotational operative positions in said bore,
said first position producing communication through said primary passage means between said inlet connection and said external space in said strainer chamber, and producing communication through said secondary passage means between said internal space in said strainer chamber and said outlet connection and closing said drain connection by presenting thereto an imperforate area on said rotor,
said second rotor position continuing said communication through said primary passage means between said inlet connection and said external strainer chamber space and closing said outlet connection by presenting thereto an imperforate area on said rotor and producing communication through said tertiary passage means between said drain connection and said external strainer chamber space, whereby solids collected in said external strainer chamber space are back-flushed by water at main line pressure to waste through said drain connection.

6. A valve as recited in claim 5 wherein said rotor has a third operating position in which;
said rotor presents an imperforate area to and thus shuts off said inlet connection;
said primary passage means places said outlet connection in communication with said external space within said strainer chamber; and
said tertiary passage means places said external space within said strainer chamber in communication with said drain connection.

7. A valve as recited in claim 6 wherein said rotor has a fourth operating position in which:
said primary passage means places said outlet connection in communication with the external space within said strainer chamber;
said secondary passage means places said inlet connection in communication with said internal space within said strainer chamber; and
said tertiary passage means places said external space within said strainer chamber in communication with said drain connection.

8. In combination:
valve body means having a bore providing inlet, outlet and drain connections;
valve rotor means rotatable in said bore, said valve rotor means providing therewithin a strainer chamber and having first and second operating positions;
screen means dividing said chamber into a space external with respect to said screen means and a space internal with respect to said screen means;
said valve rotor means shutting said drain connection while in said first position and shutting said outlet connection while in said second position by presenting imperforate rotor areas respectively to said drain and outlet connections,
passage means embodied with said valve rotor means and setting up communication, with said valve rotor means in said first position, (a) between said inlet and said external strainer chamber space and (b) between said internal strainer chamber space and said outlet connection,
said passage means setting up communication, with said valve rotor means in its second position, (a) between said inlet connection and said external strainer chamber space and (b) between the latter space and said drain connection whereby solids collected in said external strainer chamber space are flushed to waste through said drain connection, while said outlet connection is shut, by water flowing into said space at main line pressure from said inlet connection.

* * * * *